United States Patent [19]

Kazimir

[11] 4,453,534
[45] Jun. 12, 1984

[54] SOLAR WATER HEATING SYSTEM

[75] Inventor: Donald J. Kazimir, North Palm Beach, Fla.

[73] Assignee: Solar Development, Inc., Riviera Beach, Fla.

[21] Appl. No.: 396,227

[22] Filed: Jul. 8, 1982

[51] Int. Cl.³ .............................. F24J 3/02
[52] U.S. Cl. ........................ 126/420; 126/437; 126/432; 137/59
[58] Field of Search ............... 126/416, 417, 418, 419, 126/420, 422, 432, 437; 137/59, 62; 237/80; 165/12, 71, 134 R

[56] References Cited

U.S. PATENT DOCUMENTS

| | | | |
|---|---|---|---|
| 4,019,495 | 4/1977 | Frazier et al. | 126/420 |
| 4,027,821 | 6/1977 | Hayes et al. | 126/420 |
| 4,044,754 | 8/1977 | Cronin et al. | 126/420 |
| 4,133,338 | 1/1979 | Honikman | 126/420 |
| 4,138,996 | 2/1979 | Cartland | 126/420 |
| 4,191,166 | 3/1980 | Saarem et al. | 126/420 X |
| 4,256,089 | 3/1981 | Lewis et al. | 126/420 |
| 4,319,561 | 3/1982 | Pei | 126/420 X |
| 4,368,549 | 1/1983 | Ramey | 126/416 X |

FOREIGN PATENT DOCUMENTS

| | | | |
|---|---|---|---|
| 2837565 | 3/1980 | Fed. Rep. of Germany | 126/437 |
| 52-46542 | 4/1977 | Japan | 126/420 |
| 55-31265 | 3/1980 | Japan | 126/420 |

Primary Examiner—Samuel Scott
Assistant Examiner—Margaret A. Focarino
Attorney, Agent, or Firm—Jack N. McCarthy

[57] ABSTRACT

A solar water heating system for heating water in a solar panel and storing it in a water storage tank includes a pump which circulates the water in the system, from the water storage tank through the solar panel and back to the water storage tank; a freeze protection means permits water to bleed off from a location between the solar panel and water storage tank when the pump is off to maintain a flow of water through said solar panel and connecting parts thereof which are located in an area where freezing can be encountered. Means are provided to turn the pump on and off and a backup heating device is located in the water storage tank, such as an electrical heating unit, to provide heat when there is not sufficient solar energy. When a timer is used to turn the pump on and off if during some period when the pump is on the water in the solar panel is not heated, the cold water in the bottom of the water storage tank is merely recirculated in a manner having a minimal effect on the warmer water in the upper part of the water storage tank. While a timer has been referred to, a photovoltaic panel can be used to control said pump.

4 Claims, 4 Drawing Figures

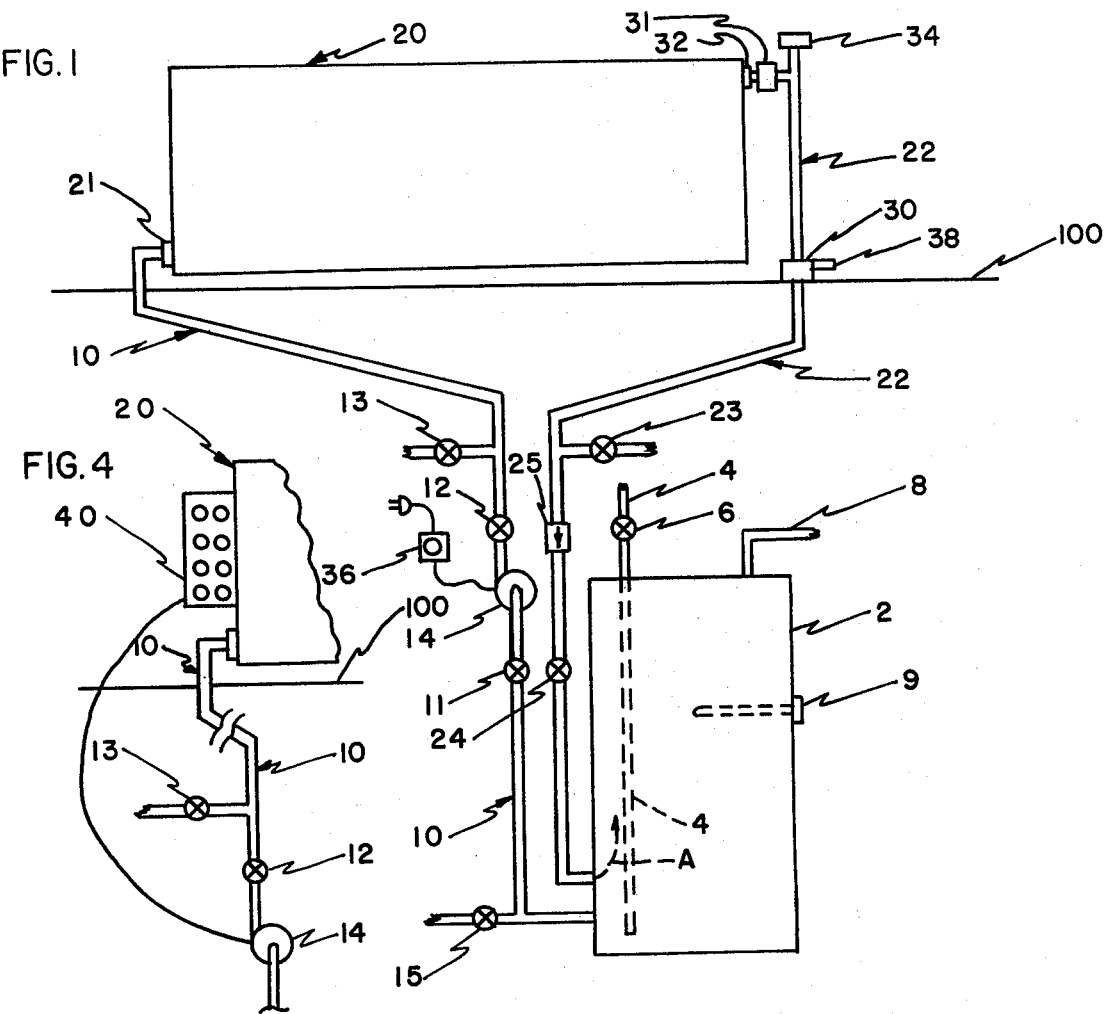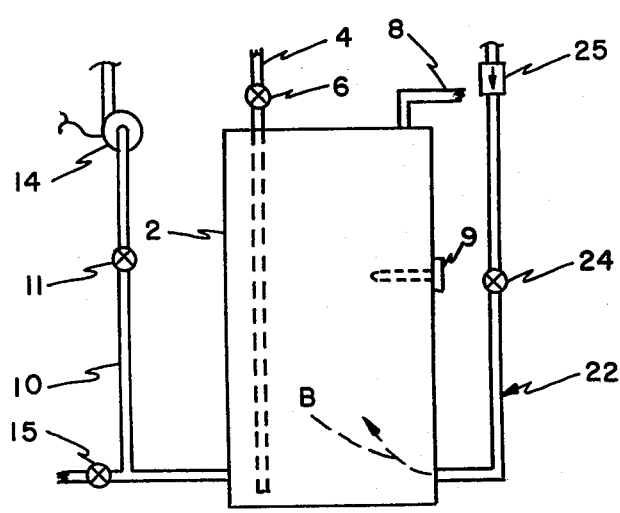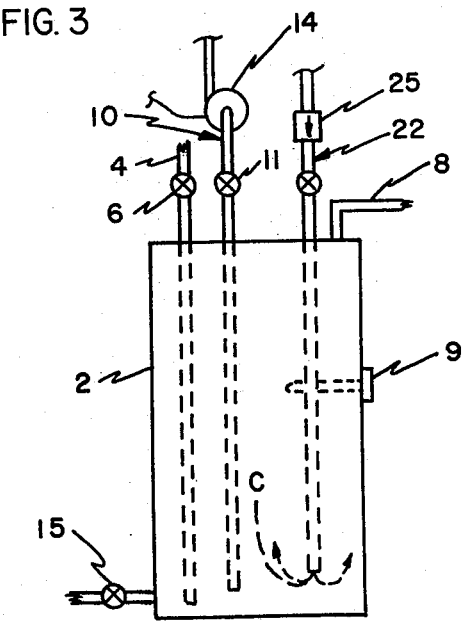

SOLAR WATER HEATING SYSTEM

BACKGROUND OF THE INVENTION

This invention relates to water heating systems operated by solar energy having simplified controls.

Solar water heaters have long been known and the following patents are set forth to give a known sample of the prior art: U.S. Pat. Nos. 1,971,242; 3,986,489; 4,019,495; 4,044,754; 4,116,219; 4,119,087; 4,133,338; 4,138,996; and 4,207,866.

SUMMARY OF THE INVENTION

A primary object of the present invention is to provide a simplified solar water heating system which can provide a minimum of controls and means for protecting the system against freezing temperatures. It is noted that this solar water heating system is recommended for use in warm climate areas where a small number of days are encountered having a freezing temperature. A simple clock timer can turn the pump on and off between two selected times.

In accordance with the present invention, a thermally operated freeze valve opens at a predetermined temperature above freezing and allows water to flow through the solar panel until the temperature of the valve is returned to a predetermined value which is felt to be safe. The flow from this freeze valve can be directed to the surface of the roof, or directed to any desired receptacle.

It is another object of this invention to withdraw water from the water storage tank at a point adjacent the bottom of the tank, pump it through the solar panel, and return it to the tank at substantially the same level; the end of the conduit returning water from the solar panel is positioned with respect to the end of the conduit taking cold water from the water storage tank to permit the water to rise if it is warmer than the water already in that area.

In accordance with a further aspect of the present invention, a photovoltaic panel is used to turn the pump on and off, and also power the pump, said pump directing water from said water storage tank, through said solar panel, and back to said water storage tank.

BRIEF DESCRIPTION OF THE DRAWINGS

FIG. 1 is a schematic view of a solar water heating system including the invention;

FIG. 2 is a first modification of the solar water heating system shown in FIG. 1 involving water flow into and out of the water storage tank;

FIG. 3 is a second modification of the solar water heating system shown in FIG. 1 involving water flow into and out of the water storage tank; and FIG. 4 is a third modification of the solar water heating system shown in FIG. 1 involving the control of the pump.

DESCRIPTION OF THE PREFERRED EMBODIMENT

In FIG. 1, a water storage tank 2 is shown having a pressurized cold water supply directed to the bottom thereof through a conduit 4 and an on-off control valve 6 is placed in the conduit 4 to turn off the water supply when desired. Hot water is directed from the water storage tank 2 by conduit 8 to an area where it is desired. The conduit 8 removes water from the top area of the water storage tank 2. A secondary heating device 9 is located in the tank 2 to provide heat to the water when there is not sufficient solar energy. This heating device 9 can be an electrical heating unit, as used in many electrical water heaters, having a temperature control. The interior of the bottom of the water storage tank 2 is connected to an inlet 21 of a solar panel 20 by conduit means 10. The conduit means 10 includes a pump 14, on-off valves 11 and 12 on the inlet and outlet sides of said pump, respectively, and a drain connection and valve 13 located between on-off valve 12 and inlet 21. Valve means 15 are provided to drain water from the system at the level of the bottom of the water storage tank 2.

An outlet 32 of the solar panel 20 is connected by a conduit means 22 to the bottom of the water storage tank 2 at substantially the same level as the connection of conduit means 10. The connection of the conduit means 22 is shown, in FIG. 1, located on the same side as the connection of conduit means 10 and a short distance above in a manner to permit water entering through conduit 22 to rise if it is warmer than the water in that area in water storage tank 2 and not be immediately recirculated. Note the arrow A indicating flow of water warmer than that already in the bottom of the water storage tank 2.

The conduit means 22 includes an on-off valve 24, a one-way check valve 25, and a drain connection and valve 23, similar to drain connection and valve 13. Conduit means 22 also includes a thermally operated freeze valve means 30, pressure relief valve 31 and an automatic air vent 34. Any desired solar panel can be used. The solar panel is mounted to maximize the effect of the sun on the tubing and in a manner so that water in the solar panel 20 can be drained therefrom by opening valves 13 and 23 in the drain connections after closing valves 12 and 24.

To maintain a desired flow of water from water storage tank 2 through conduit means 10, solar panel 20, conduit means 22, and back to tank 2, pump 14 is actuated. In FIG. 1, this is shown as being done by a timer 36 which can be set to come on at a desired time, when sun is normally striking the solar panel, and can be set to be turned off as the sun is setting and its rays are prevented from striking the solar panel. However, the timer may be set in any manner to come on and go off as desired by an operator.

It can therefore be seen that in the arrangement as set forth in FIG. 1, the system will come on at a preset time every day as set by timer 36 and go off at a preset time. If the day is sunny and the water from the solar panel 20 returns hotter than the water in the water storage tank 2, it will rise to the top of the tank and the colder water will continue to be taken through conduit means 10 from the bottom of the tank. If the day is heavily overcast and the water from the solar panel 20 returns at the same temperature or a little cooler, it will remain at the bottom of the tank with the remainder of the cold water and continue to be recirculated, having a minimum effect on the hot water at the upper portion of the tank 2. If the day does not provide enough solar energy to heat the water, this will bring the heating device 9 into operation, should the temperature of the water drop below that set on the temperature control. In a system tested, the control for the secondary heating device was set to maintain a 120° F. (49° C.) temperature.

Concerning a freezing condition, it has been noted that water can be drained from the solar panel 20 and exposed portions of conduit means 10 and conduit means 22 by draining the water therefrom by opening valves 13 and 23 in the drain connections after closing valves 12 and 24. It is also to be noted that if one knows that a freezing temperature is to be reached in the system, then the timer 36 can be turned on so that water will flow through the solar panel 20 to prevent freezing of any of the exposed parts. However, that would involve electrical power and an action on the part of the operator to anticipate a freezing condition. This system provides an automatic freeze protection without the need for electrical power and involves the use of a thermally operated freeze valve 30 which can be set to open as the temperature at that point approaches freezing, say for example, 40° F. (4.5° C.) and this will open the valve 30 and permit water to flow therefrom at an outlet 38. When this happens, water from the water storage tank 2 is forced through conduit means 10 (including pump 14), solar panel 20 and a portion of conduit means 22 and outlet 38 of valve 30. A roof line is indicated by reference numeral 100. While substantial portions of conduit means 10 and conduit means 22 are shown above the roof line 100, the inlet 21 and outlet 32 of the solar panel could be connected directly through the roof line 100, minimizing parts of the system subjected to possible freezing weather. The thermally operated freeze valve 30 is mounted adjacent the roof line 100 with any part of the system below the valve being insulated and protected from the freezing temperature. The one-way check valve 25 prevents the pressurized water in water storage tank 2 from flowing up conduit means 22 when the thermally operated freeze valve 30 opens. The water flowing out the outlet 38 of valve 30 can be allowed to run down the roof, or be directed to some desired receptacle. As the valve warms up it closes at a pre-set temperature above the opening temperature.

It is noted that valves 11 and 24 can be placed in an off-position to isolate the water storage tank 2 and valves 11 and 12 can be turned off to isolate the pump 14. This is advantageous when it is necessary that these elements be worked on.

The modification shown in FIG. 2 places the conduit means 22 on the opposite side of the water storage tank 2 and permits the conduit means 22 to be connected in a lower location in the water storage tank 2, yet spaced from the outlet connection of conduit means 10. The flow of warm water through conduit means 22 would flow upwardly as shown by arrow B and again, if it were a heavily overcast day, the returning water would remain in the bottom of the water storage tank with the remainder of the cold water, and the cold water would merely be circulated, as described above.

The modification shown in FIG. 3 uses all top connections to the water storage tank 2 and runs the conduit means 10 and 22 down to locations adjacent the bottom of the water storage tank 2, with the ends of the conduit means 10 and 22 spaced apart. The flow of warm water through conduit means 22 would flow upwardly as shown by arrows C and here again, if it were a heavily overcast day, the cold water would remain in the bottom of the water storage tank 2, with the remainder of the cold water, and the cold water will merely be recirculated, as mentioned above.

The modification shown in FIG. 4 includes the use of a photovoltaic panel 40 which is connected to the pump 14. This photovoltaic panel 40 is operated by the sun and provides the power to run the pump 14. This arrangement would operate the pump 14 only when called for by solar energy from the sun.

I claim:

1. In a pressurized solar water heating system; a water storage tank; first conduit means for connecting a pressurized water supply to the lower part of said tank; a solar panel having an inlet and an outlet; second conduit means connecting the lower part of said water storage tank to the inlet of said solar panel for delivering water thereto; third conduit means connecting the outlet of said solar panel to the lower part of said water storage tank for returning water thereto; said solar panel being located in an area where freezing temperatures can be encountered; pump means in said second conduit means for circulating water from a first location in the lower part of said water storage tank through said second conduit means, said solar panel, and said third conduit means back into the lower part of said water storage tank at a second location spaced from said first point; means for turning said pump on and off; said third conduit means having a thermally operated freeze valve; said thermally operated freeze valve being set to open at a predetermined temperature to prevent the freezing of said solar panel when said pump is off by bleeding water from said third conduit means to maintain a flow of water under pressure of water in said water storage tank through said second conduit means, said solar panel, and the portion of said third conduit means between said solar panel and said thermally operated freeze valve; a one-way check valve located in said third conduit means between said thermally operated freeze valve and said water storage tank prevents flow through the portion of said third conduit means between said water storage tank and thermally operated freeze valve toward said freeze valve.

2. A pressurized solar water heating system as set forth in claim 1 wherein said means for turning said pump on and off comprises a timer, said timer being set to turn said pump on at a predetermined time during the day and to turn said pump off at a second predetermined time during the day, said pump circulating the water in said solar water heating system from said first location to said second location regardless of whether or not the water is heated in the solar panel.

3. A pressurized solar water heating system as set forth in claim 2 wherein said first and second locations are positioned at the bottom of said water storage tank and spaced permitting heated water pumped to said second location to rise in the water storage tank and not be recirculated through said first location and to permit unheated water pumped to said second location to remain at the bottom of said water storage tank, having a minimum effect on the warmer water at the upper part of the water storage tank.

4. A pressurized solar water heating system as set forth in claim 1 including; means for draining water from said solar panel including, a first drain connection and valve means (13) connected to said second conduit means (10) upstream of said inlet (21), a second drain connection and valve means (23) connected to said third conduit means (22) downstream of said thermally operated freeze valve (30), a first valve means (12) connected to said second conduit means (10) between said first drain connection and valve means (13) and said first location, a second valve means (24) connected to said third conduit means (22) between said second drain connection and valve means (23) and said second location, said valve means (13) and (23) being closed for regular operation while said first valve means (12) and second valve means (24) are open, said valve means (13) and (23) being open for draining operation while said first valve means (12) and second valve means (24) are closed.

* * * * *